United States Patent
Morooka et al.

(10) Patent No.: US 8,243,436 B2
(45) Date of Patent: Aug. 14, 2012

(54) CONNECTING MODULE AND ELECTRONIC DEVICE COUPLING SYSTEM

(75) Inventors: Hisao Morooka, Kawasaki (JP); Masahiko Kyouzuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/076,798

(22) Filed: Mar. 31, 2011

(65) Prior Publication Data

US 2011/0182038 A1  Jul. 28, 2011

Related U.S. Application Data

(63) Continuation of application No. 12/458,857, filed on Jul. 24, 2009, now Pat. No. 7,940,523, which is a continuation of application No. PCT/JP2007/052398, filed on Feb. 9, 2007.

(51) Int. Cl.
  *H05K 5/00* (2006.01)
  *H05K 7/00* (2006.01)
(52) U.S. Cl. ......... 361/679.41; 361/679.07; 361/679.43; 361/679.44; 361/679.45; 361/679.56
(58) Field of Classification Search ............. 361/679.07, 361/679.41, 679.43, 679.44, 679.45, 679.55, 361/679.56
See application file for complete search history.

(56) References Cited

U.S. PATENT DOCUMENTS

| | | | |
|---|---|---|---|
| 6,185,096 B1 | 2/2001 | Helot et al. | |
| 7,047,598 B2 * | 5/2006 | Huang | 16/312 |
| 7,502,225 B2 * | 3/2009 | Solomon et al. | 361/679.41 |
| 2002/0135977 A1 | 9/2002 | Yin et al. | |
| 2003/0189812 A1 | 10/2003 | Yin et al. | |
| 2006/0061958 A1 | 3/2006 | Solomon et al. | |
| 2009/0122482 A1 | 5/2009 | Solomon et al. | |

FOREIGN PATENT DOCUMENTS

| | | |
|---|---|---|
| EP | 1637967 A2 | 3/2006 |
| EP | 1244001 A2 | 9/2009 |
| JP | 8-249086 | 9/1996 |
| JP | 8-272485 | 10/1996 |
| JP | 3059799 | 7/1999 |
| JP | 11-212671 | 8/1999 |
| JP | 11-282573 | 10/1999 |
| JP | 2001-101140 | 4/2001 |

(Continued)

OTHER PUBLICATIONS

Extended European Search Report dated Dec. 14, 2011 for corresponding European Application No. 07714010.1.

(Continued)

*Primary Examiner* — Anthony Haughton
(74) *Attorney, Agent, or Firm* — Fujitsu Patent Center

(57) ABSTRACT

A connecting module includes: a main section in which an electronic circuit is housed; a plate section that is rotatably supported by the main section, and that is adapted to lie in front of the main section, and that is rotatable between a flat position in which an electronic device is laid on a first face representing a top face and a standing position in which the electronic device is leaned against a second face representing a back face opposite to the first face; and a first connector that couples with the electronic device laid on the plate section when the plate section is in the flat position so as to connect the electronic device to the electronic circuit in the main section.

12 Claims, 8 Drawing Sheets

FOREIGN PATENT DOCUMENTS

| | | |
|---|---|---|
| JP | 2002-297261 | 10/2002 |
| JP | 2004-118386 | 4/2004 |

OTHER PUBLICATIONS

Chinese Office Action, English-language translation, issued Dec. 31, 2010 for corresponding Chinese Application No. 200780050999.9.

English Translation of the International Preliminary Report on Patentability and Written Opinion mailed Aug. 20, 2009 and issued in corresponding International Patent Application PCT/JP2007/052398.

International Search Report for PCT/JP007/052398, mailed Apr. 17, 2007.

USPTO, [Haughton] "U.S. Appl. No. 12/458,857 (parent)," [CTNF] Non-Final Rejection issued on Apr. 29, 2010.

USPTO, [Haughton] "U.S. Appl. No. 12/458,857 (parent)," [CTFR] Final Rejection issued on Sep. 8, 2010.

USPTO, [Haughton] "U.S. Appl. No. 12/458,857 (parent)," [NOA] Notice of Allowance and Issue Fees Due issued on Feb. 17, 2011.

USPTO, (Haughton) Notice of Allowance and Notice of Allowability, Apr. 18, 2012, in related U.S. Appl. No. 13/076,721 [now allowed].

* cited by examiner (a)

(b)

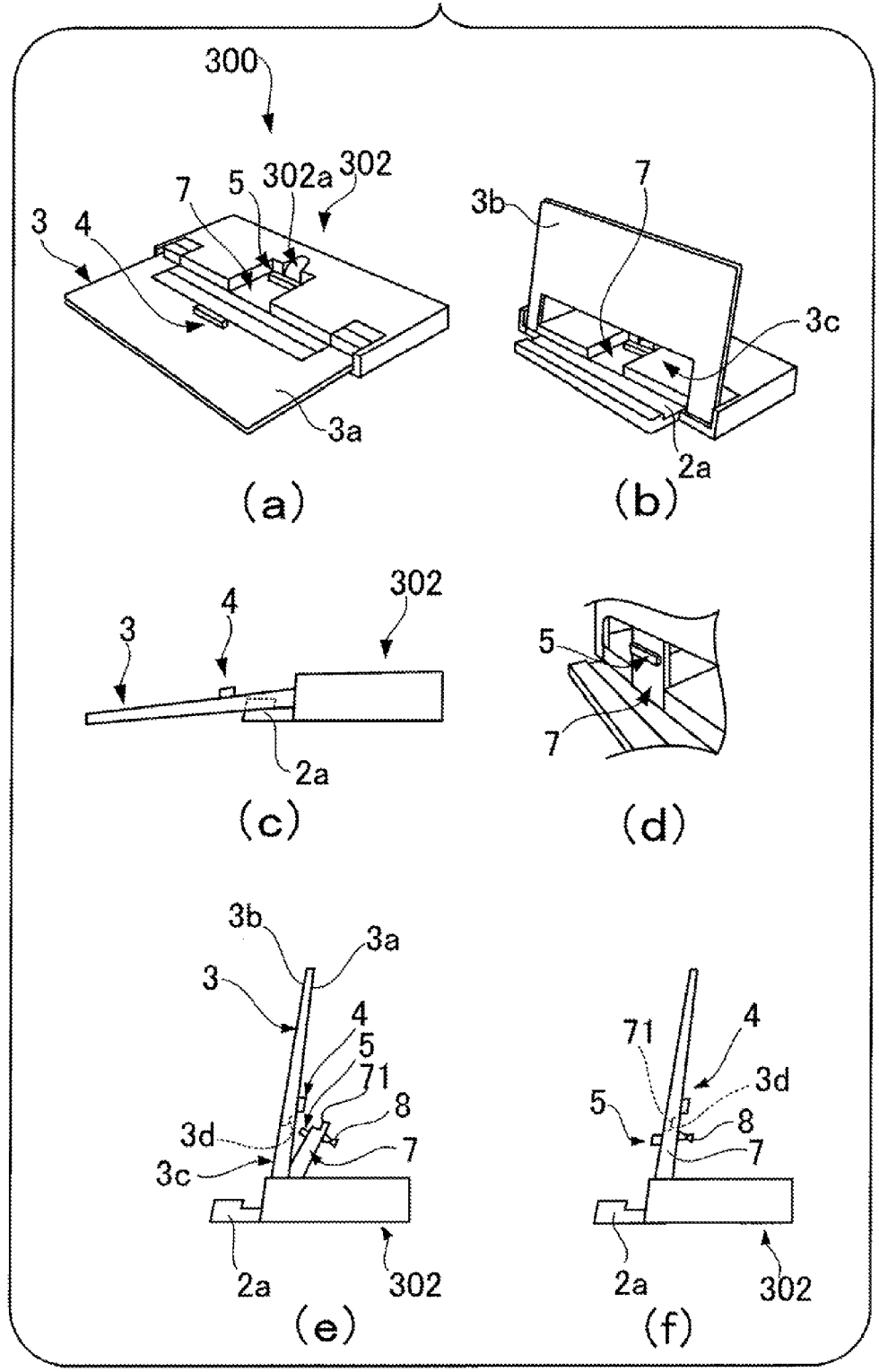

US 8,243,436 B2

CONNECTING MODULE AND ELECTRONIC DEVICE COUPLING SYSTEM

CROSS-REFERENCE TO RELATED APPLICATION

This is a continuation application of 12/458,857, filed on Jul. 24, 2009, which is a continuation of PCT/JP2007/052398, which was filed on Feb. 9, 2007. The entire contents of these applications are incorporated herein by reference.

FIELD

The present invention relates to a connecting module to which an electronic device is connected, and an electronic device coupling system.

BACKGROUND

Hitherto, in a so-called note type personal computer (hereafter, note PC) wherein it is used in an open state in which a display section stands from a main section from a close state in which the display section overlaps the main section while a display screen of the display section faces a keyboard of the main section, the connector arrangement for connecting with peripherals is kept to a minimum extent in light of portability.

Recently, there has been proposed a connecting module referred to as port replicator or docking station which is plentifully provided with connectors for connecting with an external device, and capable of coupling with the note PC, so that the note PC is used as a personal computer having a performance equivalent to that of a desktop type personal computer having a high connectivity with an external device.

In addition, in recent years, there has been used a portable type of computer called a slate type of tablet computer (hereafter, slate type computer) in which being without a keyboard provided, and a display section of the note PC in a kind is overlapped to be fixed on the main section while the display screen faces outward, wherein the connector arrangement for connecting with peripherals is kept to a minimum extent, and there has been made a proposition to improve a connectivity of the slate type computer with an external device (For example, see Japanese Laid-open Patent Publication No. 2001-101140, FIG. 3).

According to the proposal of Japanese Laid-open Patent Publication No. 2001-101140, coupling of the slate type computer with the connecting module is implemented in such a way that the slate type computer is leant against the connecting module as it is easy to look at the display screen of the slate type computer.

Further, in recent years, there is used a convertible type of tablet computer (hereafter, convertible type computer) that includes a main section having a keyboard, and a display section having a display screen and being coupled with the main section through a connecting section having two axes to rotatably support openably and closably for the main section, wherein the convertible type computer has an open state in which the display section stands on the main section, a first close state in which the display section is overlapped on the main section while the display screen faces inward, and a second close state in which the display section is overlapped on the main section while the display screen faces outward.

SUMMARY

As for the convertible type computer, there are considered two use modes of a case where it is used in the open state and a case where it is used in the second close state, such as reproducing a DVD. However, there is a problem that the connecting module proposed by Japanese Laid-open Patent Publication No. 2001-101140 is incapable of meeting these two kinds of use modes.

In view of the foregoing, it is an object in one aspect of the present invention to provide a connecting module capable of meeting also the convertible type of tablet computer, and an electronic device coupling system.

According to ac aspect of the present invention, a connecting module includes:

a main section in which an electronic circuit is housed;

a plate section that is rotatably supported by the main section, and that is adapted to lie in front of the main section, and that is rotatable between a flat position in which an electronic device is laid on a first face representing a top face and a standing position in which the electronic device is leaned against a second face representing a back face opposite to the first face; and a first connector that couples with the electronic device laid on the plate section when the plate section is in the flat position so as to connect the electronic device to the electronic circuit in the main section.

The connecting module of the present invention includes the plate section that is rotatable between the flat position and the standing position and has the first connector. Thus, for example, the plate section is rendered to be in the flat position so that the connecting module may couple with the convertible type tablet computer being in the open state. Further, the plate section is rendered to be in the standing position so that the convertible type tablet computer being in the close state may be leant against the plate section. Therefore, according to the connecting module of an aspect of the present invention, it is possible to meet the convertible type tablet computer.

According an aspect of the present invention, it is preferable that the connecting module further includes a second connector that couples with the electronic device leaned against the plate section when the plate section is in the standing position so as to connect the electronic device to the electronic circuit in the main section.

Thus, it is possible to connect the electronic device leant against the plate section being in the standing position with the electrical circuit in the main section.

In addition, according an aspect of the present invention, it is acceptable that the first connector of the connecting module according is provided on the first face of the plate section. In addition, according to an aspect of the invention, it is acceptable that the second connector in the connecting module is provided on the second face of the plate section or the connecting module further includes a receiving section that receives a bottom end part of the electronic device when the plate section is in the standing position and the electronic device is leaned against the second face wherein the second connector is provided on the receiving part.

Further, it is acceptable that in the connecting module according to the invention, the plate section includes an opening that goes through the first face and the second face, and the main section includes a connector holding section that is rotatably supported separately from the plate section, and that includes the second connector, and that is rotatable between a coupling state in which the connector holding section goes into the opening when the plate section is in the standing position so as to couple the second connector with the electronic device leant against the plate section and an apart state in which the second connector is apart from the electronic device leant against the plate section.

Here, it is desirable that the connecting module encases a power supply circuit that supplies electric power to the electronic device, and the connecting module further includes a third connector that couples with the electronic device which is leant against the plate section when the plate section is in the standing position so as to supply electric power to the electronic device.

Thus, as being provided with the third connector that couples with the electronic device leant against the plate section when the plate section is in the standing state for supplying electric power to the electronic device, it possible to supply electric power to the convertible type tablet computer being in the close state.

Here, it is acceptable that the electronic device is a convertible type tablet computer that includes a first section having a keyboard, and a second section having a display screen and being coupled with the first section through a connecting section having two axes to rotatably support openably and closably with respect to the first section, the convertible type tablet computer including an open state in which the second section stands on the first section, a first close state in which the second section is overlapped on the first section while the display screen faces inward, and a second close state in which the second section is overlapped on the first section while the display screen faces outward, and the connecting module couples with the convertible type tablet computer, and is leant against by the convertible type tablet computer.

According to an aspect of the present invention, an electronic device coupling system includes:

an electronic device that encases an electronic circuit and that has a connector for connecting with the electronic circuit; and a connecting module including:

a main section in which an electronic circuit is housed;

a plate section that is rotatably supported by the main section, and that is adapted to lie in front of the main section, and that is rotatable between a flat position in which an electronic device is laid on a first face representing a top face and a standing position in which the electronic device is leaned against a second face representing a back face opposite to the first face; and a connector that couples with a connector of the electronic device laid on the plate section when the plate section is in the flat position so as to connect an electronic circuit of the electronic device to the electronic circuit in the main section.

Here, it is acceptable that the electronic device is a convertible type tablet computer that includes a main section having a keyboard, and a display section having a display screen and being coupled with the main section through a connecting section having two axes to rotatably support openably and closably with respect to the main section, the convertible type tablet computer including an open state in which the display section stands on the main section, a first close state in which the display section is overlapped on the main section while the display screen faces inward, and a second close state in which the display section is overlapped on the main section while the display screen faces outward.

According to the present invention, it is possible to provide a connecting module capable of meeting the convertible type tablet computer, and an electronic device coupling system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

In FIG. 4, a same kind part as that illustrated in FIG. 1 is denoted by the same reference number as that denoted in FIG. 1;

FIG. 8 is an external perspective view of a connecting module of the present embodiment.

DESCRIPTION OF EMBODIMENTS

Preferred embodiments of the present invention will be explained with reference to accompanying drawings.

Figure 1:
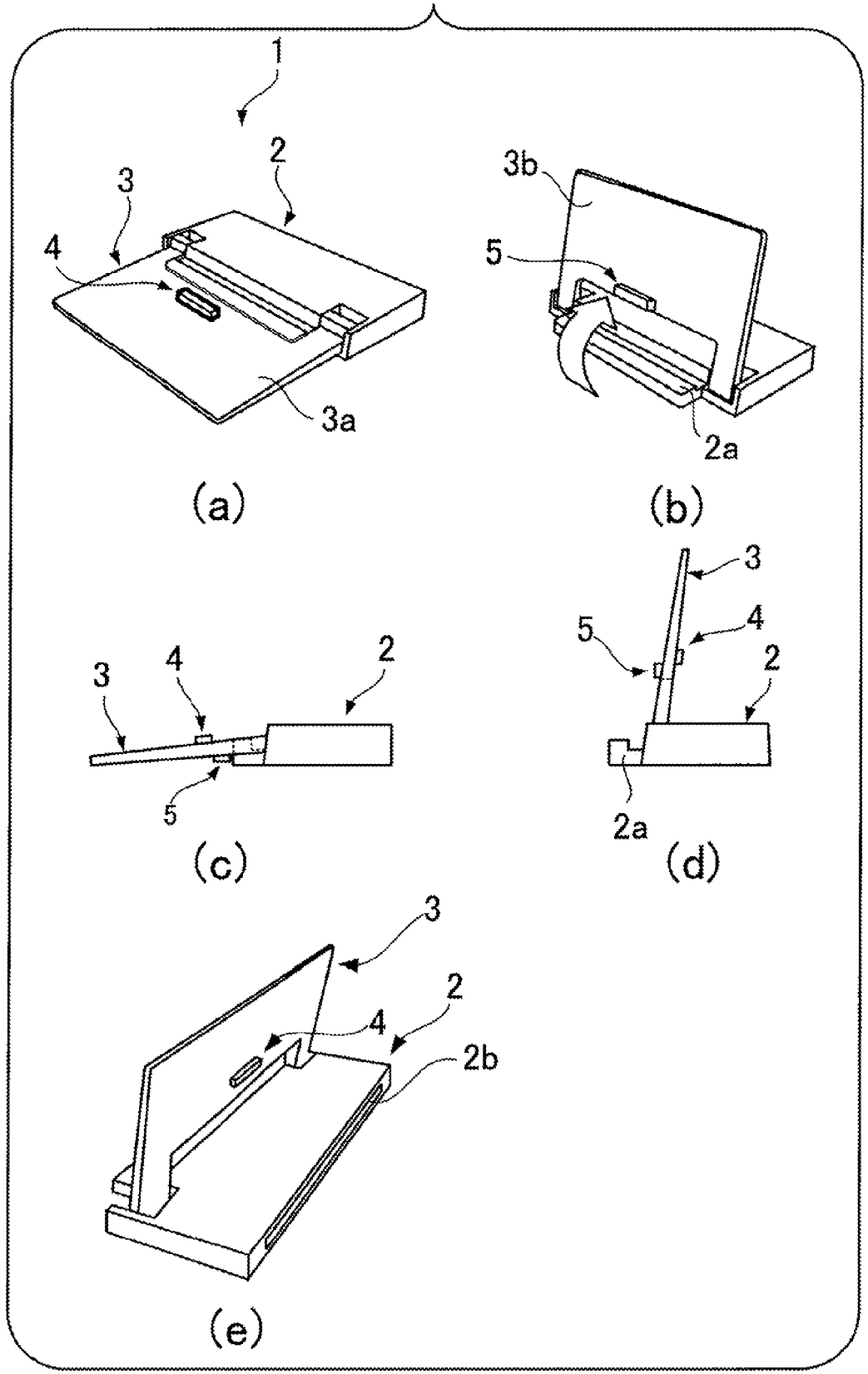
FIG. 1 illustrates a first embodiment of a connecting module of the present invention.

FIG. 1 illustrates a first embodiment of a connecting module of the present invention.

FIG. 1 illustrates that a connecting module 1 of the present embodiment includes a main section 2, a rotatable plate 3 rotatably supported by the main section 2, a first connector 4 provided in an upper face 3a of the rotatable plate 3, and a second connector 5 provided in a lower face 3b of the rotatable plate 3.

The main section 2 has a connector 2b (see, part (e) of FIG. 1) for connecting with a LAN, external display and the like on a back side and an electrical circuit (not illustrated) electrically connected with the connector 2b inside.

The rotatable plate 3 is rotatably supported by the main section 2 and is adapted to lie in front of the main section 2. The rotatable plate 3 is rotatable between a flat position (part (a) of FIG. 1) in which a convertible type tablet computer (hereafter, computer) 10 (see, FIG. 2) is laid on the upper face 3a and a standing position (part (b) of FIG. 1) in which the computer 10 is leaned against the lower face 3b.

A receiving part 2a to receive a bottom of the computer 10 being leant is provided on a front side of the main section 2.

The first connector 4 is a connector to connect with the computer 10 which is laid on the rotatable plate 3 when the rotatable plate 3 is in the flat position. The first connector 4 is connected to the electronic circuit provided in the main section 2 through an electrical wiring disposed in the rotatable plate 3.

A second connector 5 is a connector to connect with the computer 10 which is leant against the rotatable plate 3 when the rotatable plate 3 is in the standing position. The second connector 5 is functionally the same type of connector as the first connector 4. The second connector 5 is also connected to the electronic circuit of the main section 2 through an electric wiring disposed in the rotatable plate 3.

Part (c) of FIG. 1 depicts an appearance in which the rotatable plate 3 being in the flat position illustrated in part (a) of FIG. 1 is viewed from left. Part (d) of FIG. 1 depicts an appearance in which the rotatable plate 3 being in the standing position illustrated in part (b) of FIG. 1 is viewed from left.

In addition, part (e) of FIG. 1 depicts an appearance in which the connecting module 1 is viewed from back. There is depicted a connector 2b which is provided on a back side of the main section 2 for connecting with a LAN (Local Area Network), a printer and the like.

Figure 2:
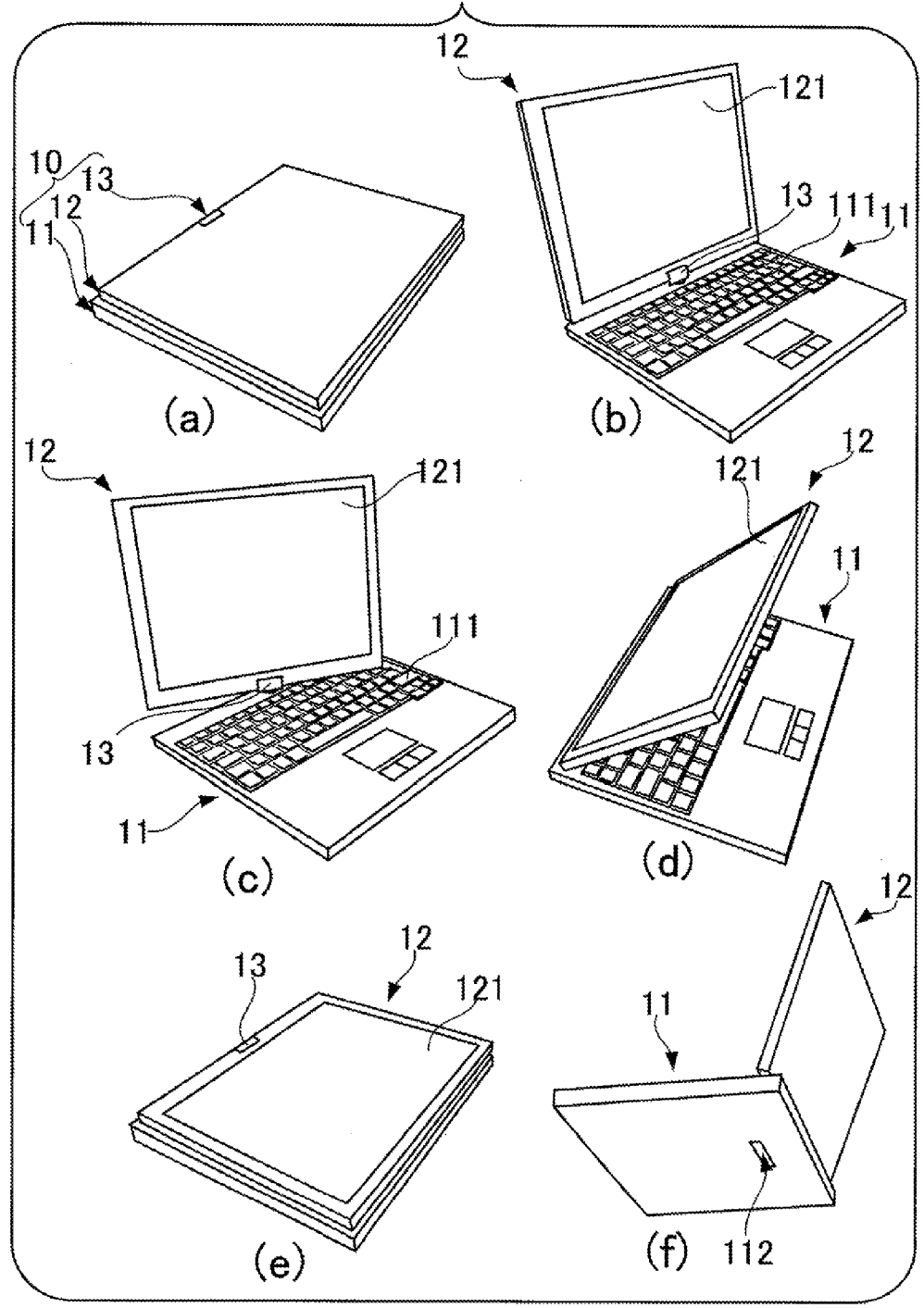
FIG. 2 is a diagram illustrating a computer to which the connecting module illustrated in FIG. 1 is adaptable.

FIG. 2 is a diagram illustrating a computer to which the connecting module illustrated in FIG. 1 is adaptable.

FIG. 2 illustrates the computer 10 including: a base section 11 having a keyboard 111; and a display screen section 12 having a display screen 121 and being coupled with the base section 11 through a connection section 13 having two axes to support openably and closably and rotatably with respect to the base section 11. The computer 10 is a so-called convertible type tablet computer that has an open state in which the display screen section 12 stands from the base section 11, a first close state in which the display screen section 12 is overlapped on the base section 11 while the display screen 121 faces inward, and a second close state in which the display screen section 12 is overlapped on the base section 11 while the display screen 121 faces outward.

Part (a) of FIG. 2 illustrates an appearance where the computer 10 is in the first close state as described above. Part (b) of FIG. 2 illustrates an appearance where the computer 10 is in the open state as described above.

Part (c) of FIG. 2 to part (e) of FIG. 2 illustrate a process in which the computer 10 is rendered from the open state depicted in part (b) of FIG. 2 to the second close state. Part (c) of FIG. 2 illustrates a state in which the display screen section 12 is in some degree rotated with respect to the base section 11 through the connection section 13 having the two axes in the open state. Part (d) of FIG. 2 illustrates an appearance immediately before rotating with respect to the base section 11 is finishing and the display screen section 12 is overlapped on the base section 11 while the display screen 121 faces outward. Part (e) of FIG. 2 illustrates an appearance where the computer 10 is in the second close state. Part (f) of FIG. 2 illustrates a bottom of the base section 11 of the computer 10. The bottom of the base section 11 is provided with a first concave connector 112 with which the first connector 4 provided on the top face of the rotatable plate 3 is mated when the computer 10 is laid on an upper face of the rotatable plate 3 being in the flat position.

Figure 3:
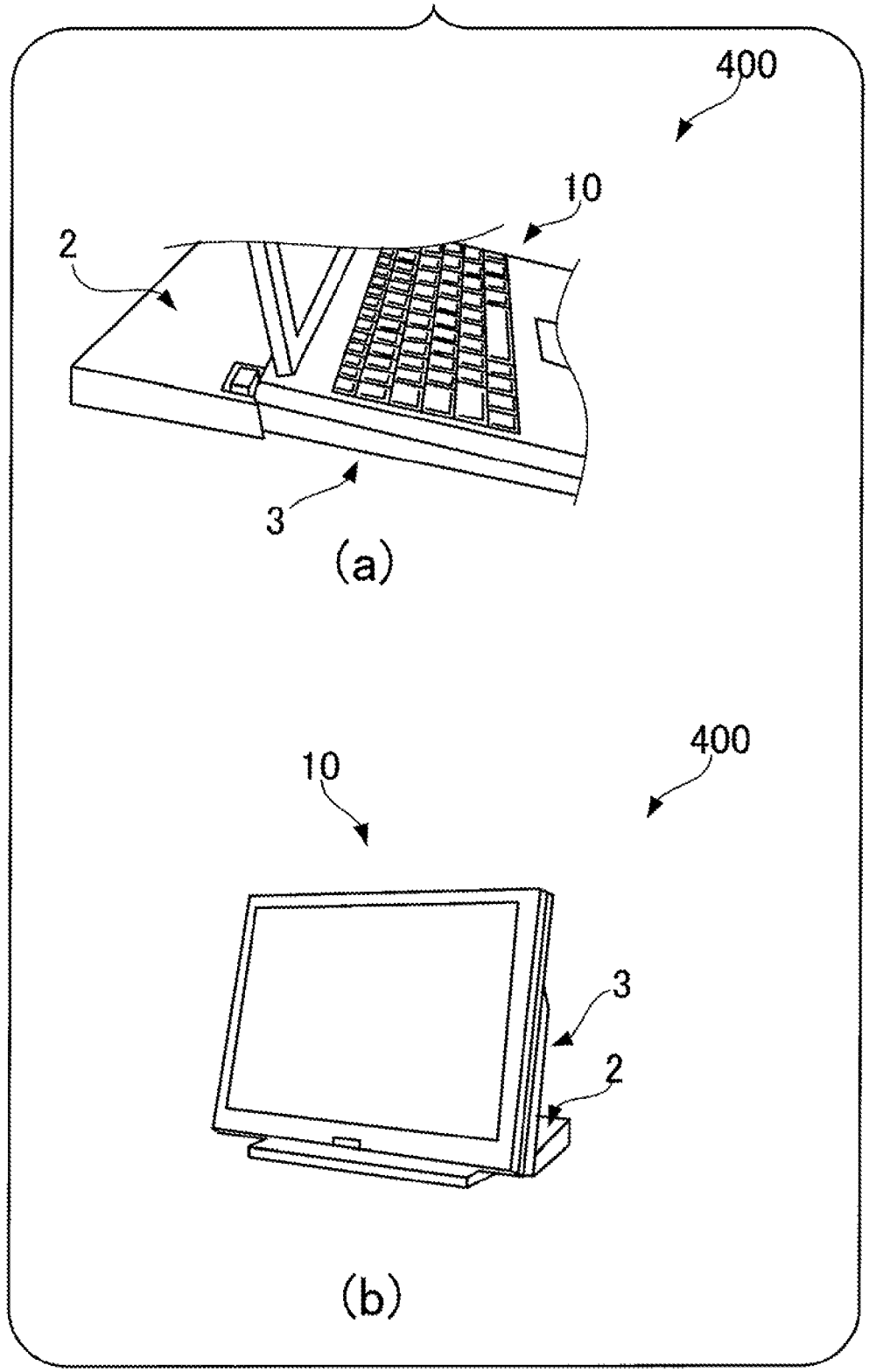
FIG. 3 is an external perspective view of an embodiment of an electronic device coupling system of the present invention.

FIG. 3 is an external perspective view of an embodiment of an electronic device coupling system of the present invention.

An electronic device coupling system 400 according to the present embodiment, as illustrated in FIG. 3, includes the computer 10 and the connecting module 1 (see, FIG. 1).

Part (a) of FIG. 3 illustrates an appearance where the computer 10 is laid on the rotatable plate 3 being in the flat position. Part (b) of FIG. 3 illustrates the appearance where the computer 10 is leaned against the rotatable plate 3 being in the standing position.

In the electronic device coupling system 400 of the present embodiment, when the rotatable plate 3 of the connecting module 1 is in the flat position depicted in part (a) of FIG. 1, the computer 10 is laid in such a manner that the first connector 4 provided on the top face of the rotatable plate 3 is engaged with the first concave connector 112 provided in the bottom of the computer 10, so that the computer 10 is coupled with the connecting module 1 and the electrical circuit of the main section 2 of the connecting module 1 is electrically connected with the electrical circuit of the computer 10.

In addition, in the electronic device coupling system 400 of the present embodiment, when the rotatable plate 3 of the connecting module 1 is in the standing position depicted in part (b) of FIG. 1, the computer 10 is leant in such a manner that the second connector 5 provided on the lower face 3b of the rotatable plate 3 is engaged with the first concave connector 112 provided in the bottom of the computer 10, so that the electrical circuit in the computer 10 is coupled with the connecting module 1, and the electrical circuit in the computer 10 is electrically connected with the electrical circuit of the main section 2. As described above, because the electrical circuit of the main section 2 is connected to the connector 2b for connecting with a LAN, a printer and the like, the computer 10 electrically connected with the electrical circuit of the main section 2 may obtain a high connection performance beyond a connecting performance provided in the computer itself.

As explained above, according to the connecting module 1 of the present embodiment, it is possible to meet the computer 10 which is used in the open state in which the display screen section 12 stands with respect to the base section 11 and in the second close state in which the display screen section 12 is overlapped on the base section 11 while the display screen 121 faces outward. Further, in the electronic device coupling system 400 of the present embodiment, the electrical circuit of the computer 10 is electrically connected with the electrical circuit of the main section 2, the computer 10 may obtain a high connecting performance beyond a connecting performance provided in the computer 10 itself. In addition, according to the connecting module 1, it is possible to meet the slate type tablet computer, in a kind, used only in the second close state as described above, or the notebook type personal computer used, in a kind, only in the open state as described above. In the above-described embodiment, the example is explained that the first connector 4 is provided in the upper face 3a of the rotatable plate 3, and the second connector 5 is provided in lower face 3b of the rotatable plate 3. However, as far as the rotatable plate 3 is arranged to be coupled with the computer 10 which is laid on the upper face 3a of the rotatable plate 3 when the rotatable plate 3 is in the flat state, a position in which the first connector 4 is provided is not limited to the upper face 3a of the rotatable plate 3. Further, as far as the rotatable plate 3 is arranged to be coupled with the computer 10 which is leaned against the lower face 3b of the rotatable plate 3 when the rotatable plate 3 is in the standing state, a position in which the second connector 5 is provided is not limited to the lower face 3b of the rotatable plate 3. Furthermore, in the above-described embodiment, the example is explained that the second connector 5 to contribute to a connection of the computer 10 with the electrical circuit of the main section also in a case where the computer 10 is leant. However, even if the second connector 5 is not provided and the computer 10 is not to be connected with the electrical circuit in the main section when the computer 10 is leant, a basic effect of the present invention is not damaged.

Next, there will be explained a second embodiment of a connecting module of the present invention.

Figure 4:
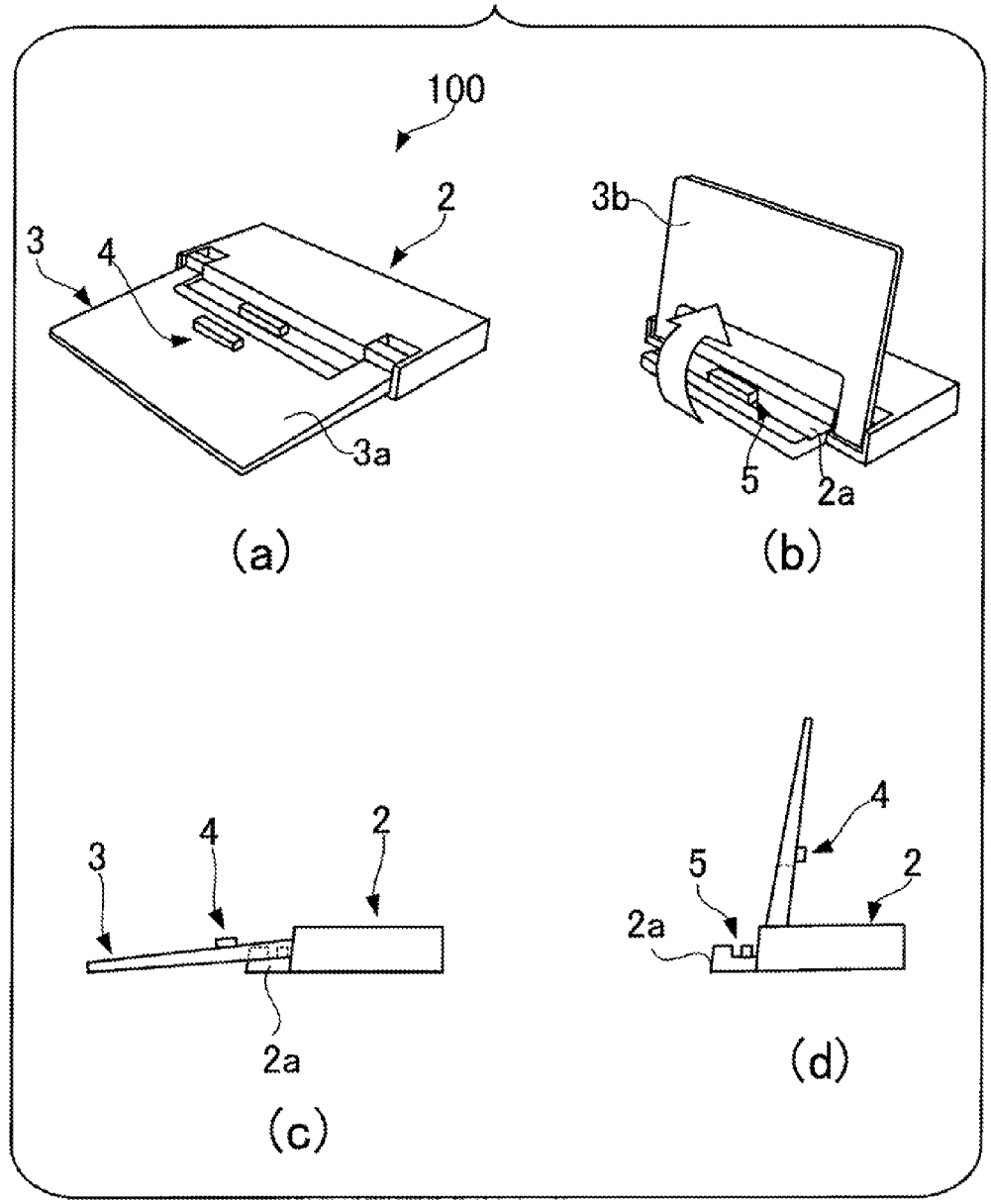
FIG. 4 illustrates a connecting module of the present embodiment.

FIG. 4 illustrates a connecting module of the present embodiment. In FIG. 4, a same kind part as that illustrated in FIG. 1 is denoted by the same reference number as that denoted in FIG. 1.

The difference between the connecting module 100 depicted in FIG. 4 and the connecting module 1 depicted in FIG. 1 is in that the second connector 5, which is provided in the lower face 3b of the rotatable plate 3 in the connecting module 1 illustrated in FIG. 1, is provided in the receiving part 2a of the main section 2 in the connecting module 100 of the present embodiment.

Part (a) of FIG. 4 depicts a flat state of the rotatable plate 3 of the connecting module 100. Part (b) of FIG. 4 depicts a standing state of the rotatable plate 3 of the connecting module 100. In addition, part (c) of FIG. 4 depicts an appearance in which the rotatable plate 3 being in the flat state is viewed from left. Part (d) of FIG. 4 depicts an appearance in which the rotatable plate 3 being in the standing state is viewed from left.

Figure 5:
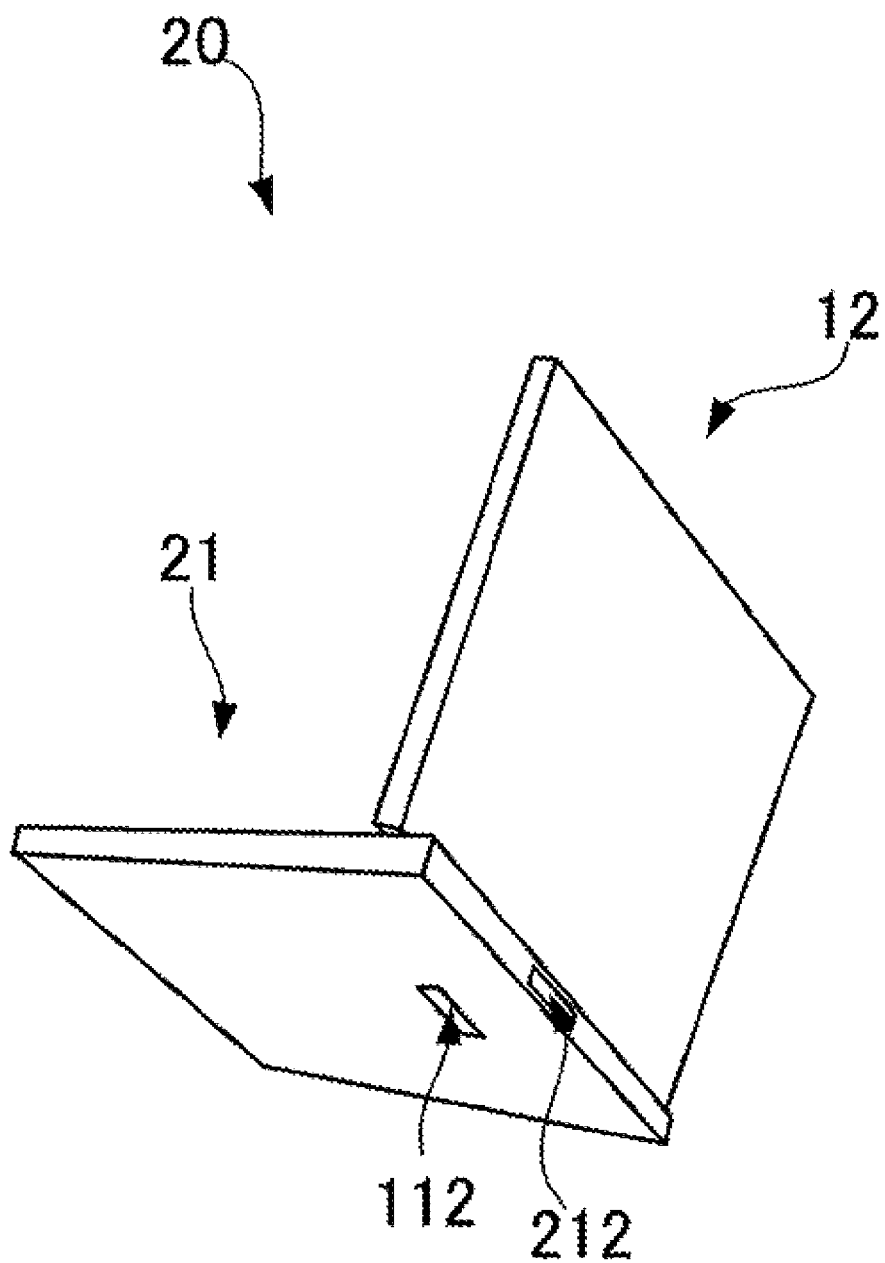
FIG. 5 illustrates a computer to which the connecting module of the present embodiment is adaptable.

FIG. 5 illustrates a computer to which the connecting module of the present embodiment is adaptable.

FIG. 5 depicts a computer 20 to which the connecting module 100 is applicable. The computer 20 is provided with a second concave connector 212, which is functionally the same as the first concave connector 112, in the position that becomes a bottom and when the computer 20 is leant against the connecting module 100, differently from the computer 10 depicted in FIG. 2.

When the rotatable plate 3 of the connecting module 100 is in the flat position depicted in part (a) of FIG. 4 of the present embodiment, the computer 20 is laid in such a manner that the first connector 4 provided on the upper face 3a of the rotatable plate 3 is engaged with the first concave connector 112 provided in the bottom of the computer 20, so that the computer 20 is coupled with the connecting module 100, and the computer 20 is electrically connected with the electrical circuit of the main section.

In addition, when the rotatable plate 3 of the connecting module 100 of the present embodiment is in the standing position depicted in part (b) of FIG. 4, the computer 20 is leant in such a manner that the second connector 5 provided on the receiving part 2a of the main section 2 is engaged with the second concave connector 212 provided in the computer 10, so that the computer 20 is coupled with the connecting module 100, and the computer 10 is electrically connected with the electrical circuit of the main section 2. As described above, because the electrical circuit is connected to the connector 2b for connecting with a LAN, a printer and the like, the computer 10 electrically connected with the electrical circuit of the main section may obtain a high connecting performance beyond a connecting performance provided in the computer itself.

As explained above, also according to the connecting module 100 of the present embodiment, it is possible to meet the computer 20 which is used in the open state in which the display screen section 12 stands with respect to the base section 21, and in the second close state in which the display screen section 12 is overlapped on the base section 11 while the display screen 121 faces outward.

Next, there will be explained a third embodiment of the connecting module of the present invention.

Figure 6:
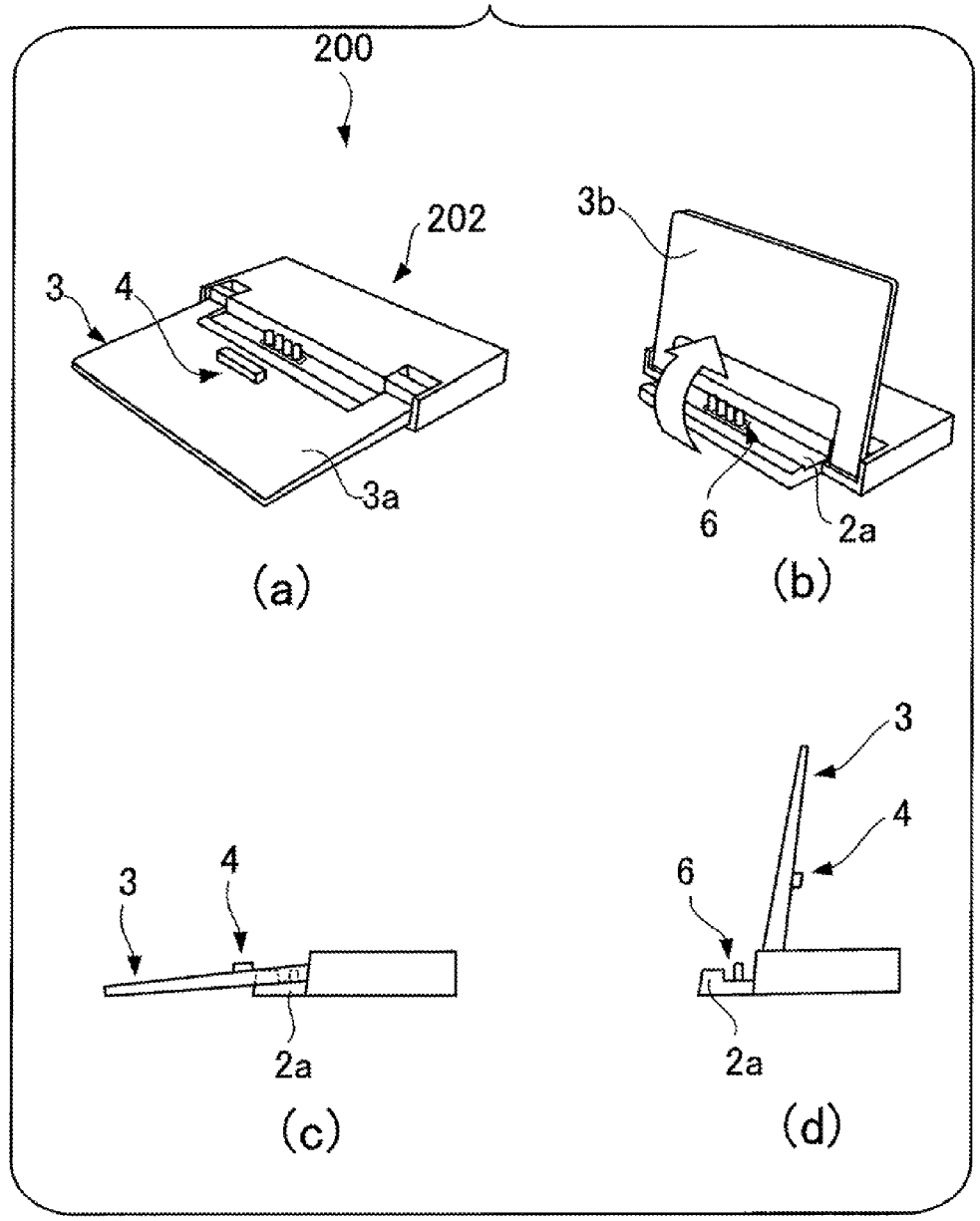
FIG. 6 illustrates a connecting module of the present embodiment.

FIG. 6 illustrates a connecting module of the present embodiment. In FIG. 6, a same part as that illustrated in FIG. 4 is denoted by the same reference number as that denoted in FIG. 4.

The difference between the connecting module 200 depicted in FIG. 6 and the connecting module 100 depicted in FIG. 4 is in that while the second connector 5 is provided in the receiving part 2a of the main section 2 in the connecting module 100 illustrated in FIG. 4, a third connector 6 instead of the connector 5 is provided in the receiving part 2a of the main section 200 in the connecting module 200 of the present embodiment. The third connector 6 is to supply electric power to the computer 30 (see, FIG. 7) through a power supply circuit (not illustrated) provided in the main section.

Part (a) of FIG. 6 depicts a flat state of the rotatable plate 3 of the connecting module 200. A part (b) of FIG. 6 depicts a standing state of the rotatable plate 3 of the connecting module 200. In addition, part (c) of FIG. 6 depicts an appearance in which the rotatable plate 3 being in the flat state is viewed from left. Part (d) of FIG. 6 depicts an appearance in which the rotatable plate 3 that is in the standing state is viewed from left.

Figure 7:
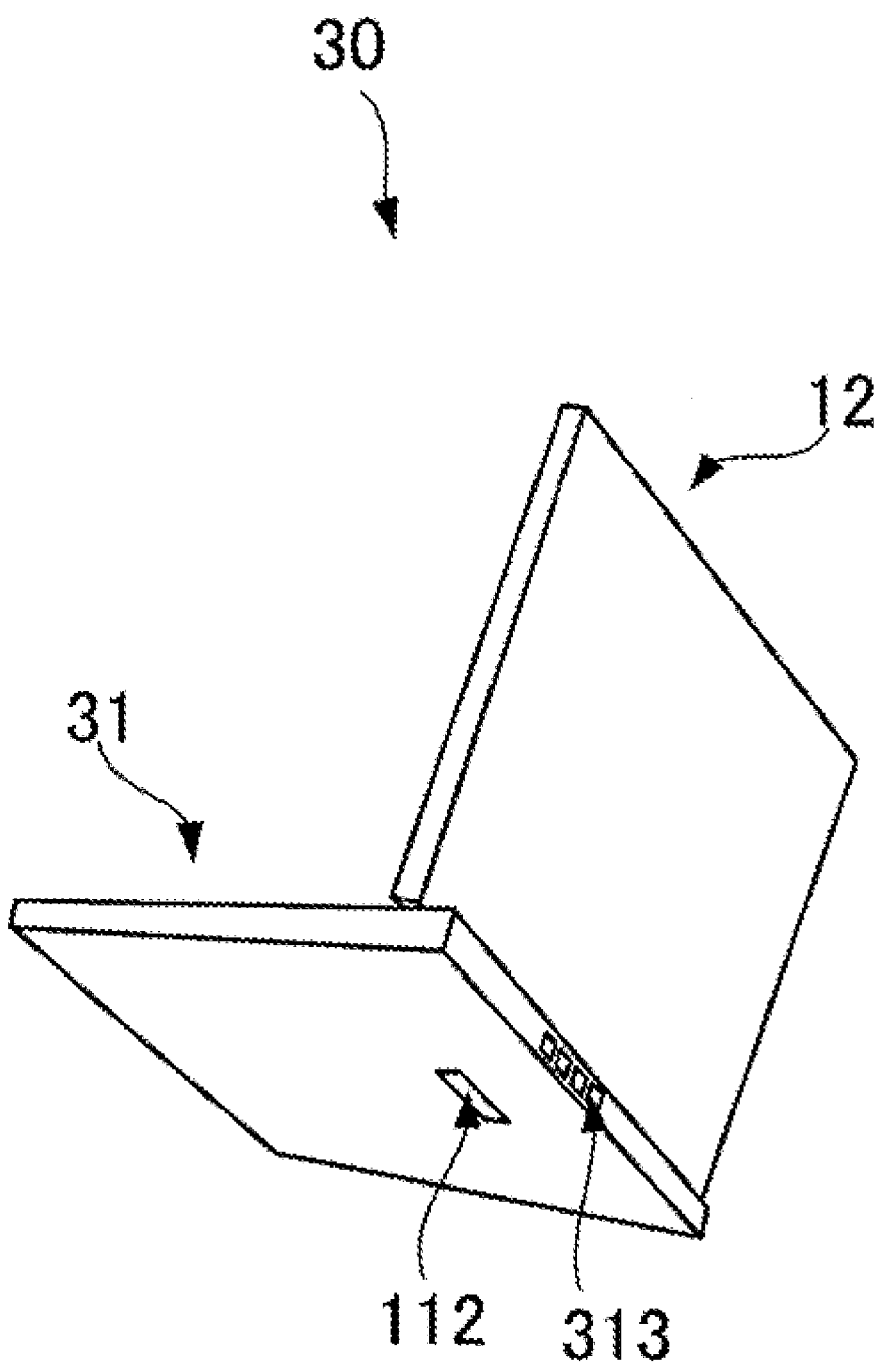
FIG. 7 depicts a computer 30 for which the connecting module 200 suitable.

FIG. 7 illustrates a computer to which the connecting module of the present embodiment is adaptable.

FIG. 7 depicts a computer 30 for which the connecting module 200 suitable. The computer 30 is provided with a third concave connector 313 at a position where the second concave connector 212 is provided in the computer 20 depicted in FIG. 5. The third concave connector 313 is adapted to be engaged with the third connector 6, which is provided in the receiving part 2a of the main section 202 in the connecting module 200 of the present embodiment to supply electric power to the computer 30. The third concave connector 313 is engaged with the third connector 6 so that electric power is supplied to the computer 30 from the power supply circuit provided in the main section.

When the rotatable plate 3 of the connecting module 200 is in the flat position depicted in part (a) of FIG. 6 of the present embodiment, the computer 30 is laid in such a manner that the first connector 4 provided on the top face of the rotatable plate 3 is engaged with the first concave connector 112 provided in the bottom of the computer 30, so that the computer 30 is coupled with the connecting module 200, and the computer 30 is electrically connected with the electrical circuit in the main section. Similarly to the connecting module 1 of the first embodiment, the electrical circuit is connected to the connector 2b for connecting with a LAN, a printer and the like. Thus, the computer 30 may obtain a high connecting performance beyond a connecting performance provided in the computer 30 itself.

When the rotatable plate 3 of the connecting module 200 of the present embodiment is in the standing position depicted in part (b) of FIG. 6, the computer 30 is leant in such a manner that the third connector 6 provided in the receiving part 2a of the main section 202 is engaged with the third concave connector 313 provided in the computer 30, so that the computer 30 is coupled with the connecting module 200 and is supplied with electric power.

As explained above, also according to the connecting module 200 of the present embodiment, it is possible to meet the computer 30 which is used in the open state in which the display screen section 12 stands with respect to the base section 31, and the second close state in which the display screen section 12 is overlapped on the base section 11 while the display screen 121 faces outward.

In addition, in the present embodiment, the example is explained that the third connector 6 is provided in the receiving part 2a of the main section 202. However, according to the present invention, as far as the third connector 6 is coupled with the computer 30 which is leaned against the rotatable plate 3 when the rotatable plate 3 is in the standing state, the position in which the third connector 6 is provided is not limited to that place. In addition, the computer 30 may be in any of the first close state and the second close state.

Lastly, there will be explained a forth embodiment of a connecting module of the present invention.

FIG. 8 is an external perspective view of a connecting module of the present embodiment.

FIG. 8 depicts an appearance where the second connector 5, which is provided on the lower face 3b of the rotatable plate 3 in the connecting module 1 of the first embodiment, is provided on a connector holding plate 7 which is rotatably arranged in the main section 2 aside from the rotatable plate 3. In the following, it is assumed that the connecting module 300 of the present embodiment is suitable for the computer 10 for which the connecting module 1 as the first embodiment is suitable.

The connector holding plate 7 is rotatably supported by the main section 2, and when the rotatable plate 3 is in the standing position, the connector holding plate is rotatable between a coupling state in which the connector holding plate goes into an opening 3c provided in the rotatable plate 3 in order to avoid colliding with the receiving section 2a of the main section 302 in the flat state, so that the second connector 5 is coupled with the first concave connector (see, part (f) of FIG. 2) of the computer 10 leant against the rotatable plate 3 and an apart state in which the second connector 5 is apart from the computer leant against the rotatable plate 3.

Part (a) of FIG. 8 depicts the flat state in which the rotatable plate 3 of the connecting module 300 is laid, and is depicted the connector holding plate 7 provided with the second connector 5 is illustrated in the center of the main section 302. Moreover, part (a) of FIG. 8 depicts an appearance where a finger inserting section 302a for raising the connector holding plate 7 upward with a finger is provided in the main section 302.

Part (b) of FIG. 8 depicts a standing state of the rotatable plate 3 of the connecting module 300 of the present embodiment. Part (c) of FIG. 8 depicts an appearance where the connecting module 300 is viewed from left with respect to the connecting module 300.

Part (d) of FIG. 8 depicts an appearance where the connector holding plate 7 is raised with a finger from the apart state illustrated in part (a) of FIG. 8 to be in a coupling state in which the second connector 5 is coupled with the first concave connector 112 of the computer 10.

Part (e) of FIG. 8 depicts an appearance where the connector holding plate 7 is in a state between the apart state and the coupling state. Moreover, part (e) of FIG. 8 depicts an appearance where the rotatable plate 3 is provided with an cut section 3d which is adapted to engage with a difference part 71 in an edge of the connector holding plate 7 that is rotated to the rotatable plate side for the coupling state. The cut section 3d is provided so that the connector holding plate 7 is raised to the rotatable plate side and is prevented from going beyond the opening 3c of the rotatable plate 3 being in the standing state to be further rotated to a side of the receiving part 2a of the main section 2. Thus, it is possible to prevent the second connector 5 maintained on the connector holding plate 7 from being damaged by pulling the connector holding plate 7 beyond the opening 3c of the rotatable plate 3, in an event in which the computer 10 leant against the rotatable plate 3 and with the first concave connector 112 being coupled with the second connector 5 of the connector holding plate 7, is intended to be detached from the connecting module 300 carelessly without releasing the connector holding plate 7.

Moreover, part (e) of FIG. 8 depicts an appearance where a convex part 8 to be used when the second connector 5 being in the state of coupling with the computer 10 is detached is provided on a face opposite to a face where the second connector 5 is provided in the connector holding plate 7.

A part (f) of FIG. 8 depicts an appearance where when the difference part 71 of the connector holding plate 7 is engaged with the cut section 3d of the rotatable plate 3, the lower face 3b of the rotatable plate 3 and the face on which the second connector 5 of the connector holding plate 7 is provided are in a plane.

When the rotatable plate 3 of the connecting module 300 of the present embodiment is in the flat position depicted in the part (a) of FIG. 8, the computer 10 is laid in such a manner that the first connector 4 provided on the upper face 3a of the rotatable plate 3 is engaged with the first concave connector 112 provided in the bottom of the computer 10, so that the computer 10 is connected with the connecting module 300, and is electrically connected with the electrical circuit of the main section.

In addition, when the rotatable plate 3 of the connecting module 300 of the present embodiment is in the standing position depicted in the part (b) of FIG. 8, the computer 10 is leant in such a manner that the second connector 5 held by the connector holding plate 7 is engaged with the first concave connector 112 provided in the computer 10, so that the computer 10 is connected with the connecting module 300, and is electrically connected with the electrical circuit of the main section. Similarly to the connecting module 1 of the first embodiment, because the electrical circuit of is connected to the connector 2b for connecting with a LAN, a printer and the like, the computer 10 electrically connected with the electrical circuit of the main section may obtain a high connecting performance with an external device beyond a minimum extent of a connecting performance provided in itself.

As explained above, also according to the connecting module 300 of the present embodiment, it is possible to meet the computer 10 which is used in the open state in which the display screen section 12 stands with respect to the base section 11, and the second close state in which the display screen section 12 is overlapped on the base section 11 while the display screen 12 faces outward.

Further, in the present embodiment, the example in which the finger inserting section 302a for raising the connector holding plate 7 by a finger so that the connector holding plate 7 may be raised by the finger. However, the present invention is not limited to this, and it is acceptable that a cam is disposed under the connector holding plate 7 to be rotated through a switch operation, so that the connector holding plate 7 is raised.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:
1. A connecting module that is detachably connected to an electronic device, comprising:
a main section in which an electronic circuit is housed;
a plate section that is rotatably supported by the main section between a flat position in which the plate section lies in front of the main section and a standing position in which the plate section stands with respect to the main section, and that includes:
a first connector which is provided in a first face to be an top face of the plate section in the flat position; and
a second connector, wherein
the electronic device includes a bottom face in which a third connector is provided, and a side fade which is adjacent to the bottom face and in which a fourth connector is provided,
in the flat position, the bottom face of the electronic device is place on the first face of the plate section and the third connector provided in the bottom face is connected to the first connector, and
in the standing position, the bottom face of the electronic device is placed on the second face of the plate section and the fourth connector provided in the side face is connected to the second connector.

2. The connecting module according to claim 1, further comprising a receiving section which receives the side face of the electronic device when the plate section is in the standing position, wherein
the second connector is provided in the receiving section.

3. The connecting module according to claim 1, wherein the second connector and the fourth connector supply power to the electronic device.

4. The connecting module according to claim 1, wherein the second connector and the fourth connector are used for the electronic device to use an external device.

5. The connecting module according to claim 1, wherein the plate section accommodates the receiving section in the flat position, and the plate section includes an opening which is separated from the receiving section in the standing position.

6. The connecting module according to claim 1, wherein the electronic device includes:
- a first unit which includes the bottom face, the side face and a top face opposite to the bottom face;
- a second unit which includes a display screen;
- a connecting section which connects the first unit with the second unit openably and closably through a first axis and rotatably through a second axis;
- an open state in which the second unit stands with respect to the first unit; and
- a close state in which the second unit is overlapped on the first unit while the display screen faces outward,
  - in the flat position, the bottom face of the first unit in the open state is placed on the first face of the plate section and the third connector provided in the bottom face is connected to the first connector, and
  - in the standing position, the bottom face of the first unit in the close sate is placed on the second face of the plate section and the fourth connector provided in the side face is connected to the second connector.

7. A system comprising:
a connecting module; and
an electronic device, wherein
the connecting module includes:
a main section in which an electronic circuit is housed;
a plate section that is rotatably supported by the main section between a flat position in which the plate section lies in front of the main section and a standing position in which the plate section stands with respect to the main section, and that includes:
  a first connector which is provided in a first face to be an top face of the plate section in the flat position; and
  a second connector, and
the electronic device includes a bottom face in which a third connector is provided, and a side fade which is adjacent to the bottom face and in which a fourth connector is provided, wherein
in the flat position, the bottom face of the electronic device is place on the first face of the plate section and the third connector provided in the bottom face is connected to the first connector, and
in the standing position, the bottom face of the electronic device is placed on the second face of the plate section and the fourth connector provided in the side face is connected to the second connector.

8. The system according to claim 7, wherein
the connecting module includes a receiving section to receive the side face of the electronic device in the close state when the plate section is in the standing position, and
the second connector is provided in the receiving section.

9. The system according to claim 7, wherein the second connector and the fourth connector supply power to the electronic device.

10. The system according to claim 7, wherein the second connector and the fourth connector are used for the electronic device to use an external device.

11. The system according to claim 7, wherein the plate section accommodates the receiving section in the flat position, and the plate section includes an opening which is separated from the receiving section in the standing position.

12. The system according to claim 7, wherein
the electronic device includes:
- a first unit which includes the bottom face, the side face and a top face opposite to the bottom face;
- a second unit which includes a display screen;
- a connecting section which connects the first unit with the second unit openably and closably through a first axis and rotatably through a second axis;
- an open state in which the second unit stands with respect to the first unit; and
- a close state in which the second unit is overlapped on the first unit while the display section faces outward,
  - in the flat position, the bottom face of the first unit in the open state is placed on the first face of the plate section and the third connector provided in the bottom face is connected to the first connector, and
  - in the standing position, the bottom face of the first unit in the close sate is placed on the second face of the plate section and the fourth connector provided in the side face is connected to the second connector.

* * * * *